US012701488B2

(12) United States Patent
Seok et al.

(10) Patent No.: US 12,701,488 B2
(45) Date of Patent: Aug. 4, 2026

(54) EHT MULTI-LINK MAXIMUM CHANNEL SWITCHING IN WIRELESS COMMUNICATIONS

(71) Applicant: MediaTek Inc., Hsinchu City (TW)

(72) Inventors: Yongho Seok, San Jose, CA (US);
Chao-Chun Wang, San Jose, CA (US);
Kai Ying Lu, San Jose, CA (US);
James Chih-Shi Yee, San Jose, CA
(US); Gabor Bajko, San Jose, CA (US)

(73) Assignee: MediaTek Inc., Hsinchu City (TW)

( * ) Notice: Subject to any disclaimer, the term of this
patent is extended or adjusted under 35
U.S.C. 154(b) by 386 days.

(21) Appl. No.: 18/234,705

(22) Filed: Aug. 16, 2023

(65) Prior Publication Data

US 2024/0073773 A1 Feb. 29, 2024

Related U.S. Application Data

(60) Provisional application No. 63/373,737, filed on Aug.
29, 2022.

(51) Int. Cl.
| | |
|---|---|
| *H04W 74/08* | (2024.01) |
| *H04W 40/02* | (2009.01) |
| *H04W 48/12* | (2009.01) |
| *H04W 72/04* | (2023.01) |
| *H04W 76/15* | (2018.01) |

(52) U.S. Cl.
CPC ........... *H04W 40/02* (2013.01); *H04W 48/12*
(2013.01)

(58) Field of Classification Search
None
See application file for complete search history.

(56) References Cited

U.S. PATENT DOCUMENTS

| | | | | |
|---|---|---|---|---|
| 10,869,232 | B2 * | 12/2020 | Bajko | H04W 36/06 |
| 11,963,083 | B2 * | 4/2024 | Gan | H04W 40/02 |
| 12,213,173 | B2 * | 1/2025 | Kim | H04L 5/0096 |
| 2021/0274500 | A1 * | 9/2021 | Cariou | H04W 48/08 |
| 2021/0321243 | A1 | 10/2021 | Patil et al. | |
| 2022/0418022 | A1 * | 12/2022 | Kneckt | H04W 36/06 |
| 2023/0284107 | A1 * | 9/2023 | Gan | H04L 41/082 |
| | | | | 370/331 |

(Continued)

FOREIGN PATENT DOCUMENTS

EP 3866512 A1 8/2021

OTHER PUBLICATIONS

European Patent Office, Extended European Search Report in
European Patent Application No. 23193702.0-1216, Feb. 2, 2024.

(Continued)

*Primary Examiner* — Sithu Ko
(74) *Attorney, Agent, or Firm* — Andy M. Han; Han IP
PLLC

(57) ABSTRACT

Various techniques and schemes pertaining to extremely-
high throughput (EHT) multi-link maximum channel
switching in wireless communications are described. A
station (STA) multi-link device (MLD) receives an indica-
tion from a reporting access point (AP) affiliated with an AP
MLD on one link of multiple links. The STA MLD deter-
mines a channel switching time when a reported AP switches
from operating in a current channel of the reported AP to
operating in a new channel on one other link of the multiple
links based on the indication.

4 Claims, 8 Drawing Sheets

(56)         References Cited

U.S. PATENT DOCUMENTS

2023/0328619 A1 *  10/2023  Dong ................... H04W 36/06

OTHER PUBLICATIONS

"35. Extremely high throughput (EHT) MAC specification 35.1 Introduction", IEEE Draft; TGBE_CL_3, IEEE—SA, Piscataway, NJ USA, vol. 802.11be drafts, No. D1.4, Jan. 27, 2022, pp. 1-116, XP068187973.

Gabor Bajko (Mediatek): "CSA enhancement", IEEE Draft; 11-118-0203-01-000M-CSA-Enhancement, IEEE-SA Mentor, Piscataway, NJ USA, vol. 802.11m, No. 1, Jan. 17, 2018, pp. 1-4, XP068122993.

* cited by examiner

400

Figure 7:
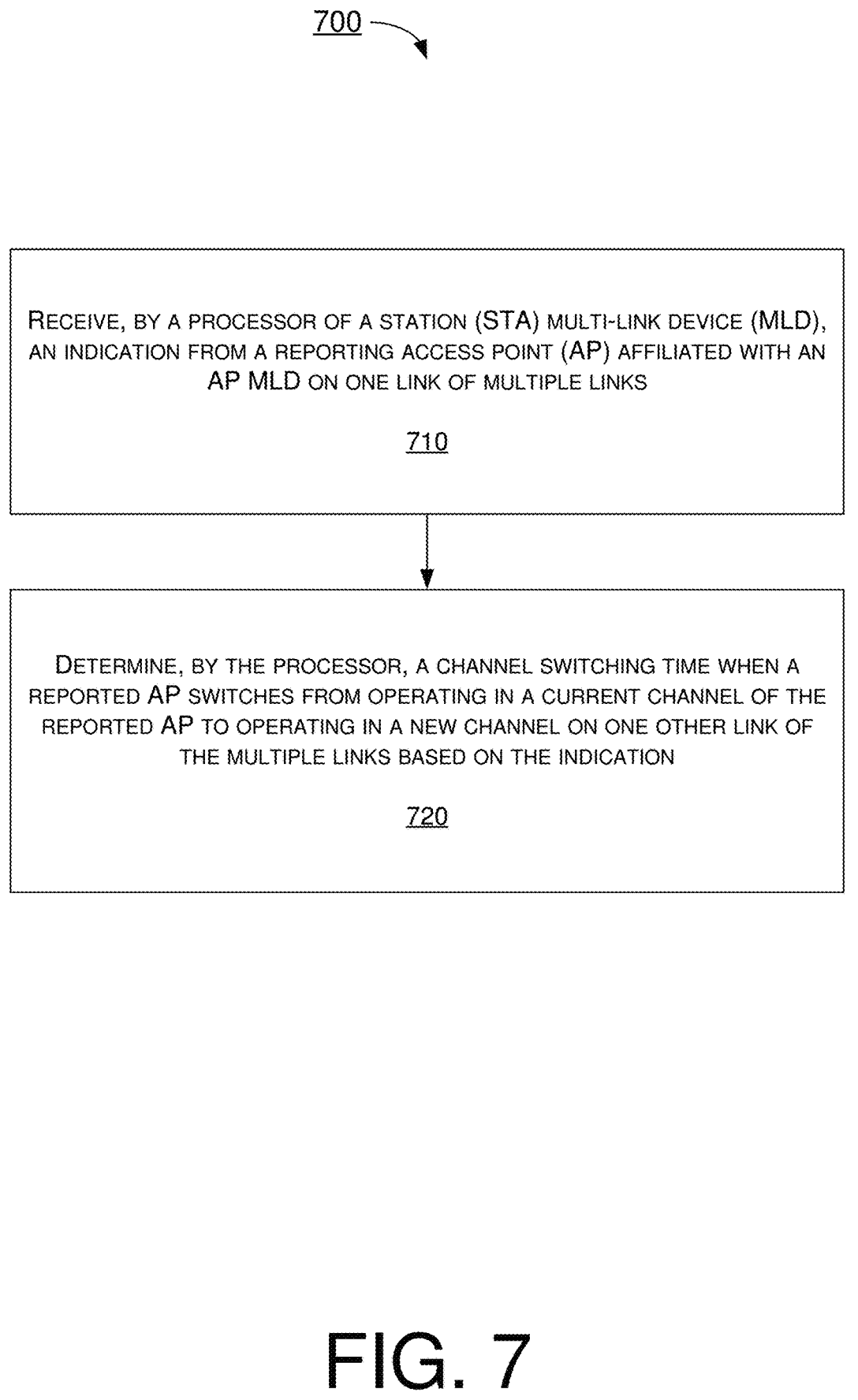

700 ⟍

RECEIVE, BY A PROCESSOR OF A STATION (STA) MULTI-LINK DEVICE (MLD), AN INDICATION FROM A REPORTING ACCESS POINT (AP) AFFILIATED WITH AN AP MLD ON ONE LINK OF MULTIPLE LINKS

710

DETERMINE, BY THE PROCESSOR, A CHANNEL SWITCHING TIME WHEN A REPORTED AP SWITCHES FROM OPERATING IN A CURRENT CHANNEL OF THE REPORTED AP TO OPERATING IN A NEW CHANNEL ON ONE OTHER LINK OF THE MULTIPLE LINKS BASED ON THE INDICATION

Figure 8:
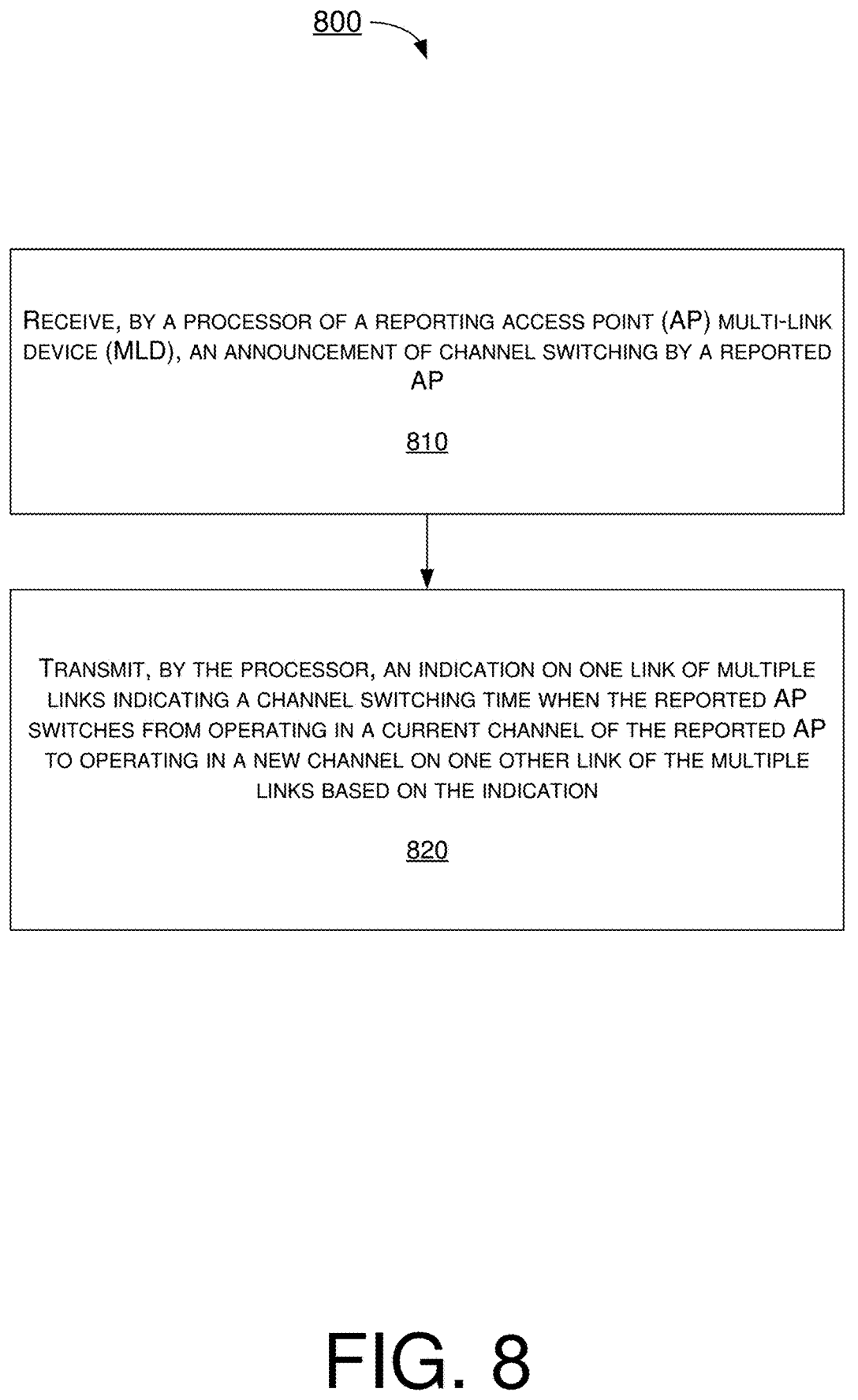

RECEIVE, BY A PROCESSOR OF A REPORTING ACCESS POINT (AP) MULTI-LINK DEVICE (MLD), AN ANNOUNCEMENT OF CHANNEL SWITCHING BY A REPORTED AP

810

TRANSMIT, BY THE PROCESSOR, AN INDICATION ON ONE LINK OF MULTIPLE LINKS INDICATING A CHANNEL SWITCHING TIME WHEN THE REPORTED AP SWITCHES FROM OPERATING IN A CURRENT CHANNEL OF THE REPORTED AP TO OPERATING IN A NEW CHANNEL ON ONE OTHER LINK OF THE MULTIPLE LINKS BASED ON THE INDICATION

EHT MULTI-LINK MAXIMUM CHANNEL SWITCHING IN WIRELESS COMMUNICATIONS

CROSS REFERENCE TO RELATED PATENT APPLICATION(S)

The present disclosure is part of a non-provisional patent application claiming the priority benefit of U.S. Provisional Patent Application No. 63/373,737, filed 29 Aug. 2022, the content of which being herein incorporated by reference in its entirety.

TECHNICAL FIELD

The present disclosure is generally related to wireless communications and, more particularly, to extremely-high throughput (EHT) multi-link maximum channel switching in wireless communications.

BACKGROUND

Unless otherwise indicated herein, approaches described in this section are not prior art to the claims listed below and are not admitted as prior art by inclusion in this section.

In a wireless local area network (WLAN) according to current Institute of Electrical and Electronics Engineers (IEEE) 802.11 specifications, a multi-link device (MLD) in a multi-link operation can perform channel switching to switch from an initial operating class/channel to a target operating class channel at a target switch time. Under the current IEEE 802.11 specification, when an access point (AP), whether an affected AP or a reported AP, affiliated with an AP MLD is witching from the initial operating class/channel to the target operating class channel at the target switch time using a channel switch announcement procedure or an extended channel switch announcement procedure, the affected/reported AP does not transmit any Beacon frames. Another AP (reporting AP) affiliated with the AP MLD would need to provide information on when the affected/reported AP will continue Beacon transmission. However, at the present time, how this is to be carried out remains to be defined. Therefore, there is a need for a solution of EHT multi-link maximum channel switching in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EHT multi-link maximum channel switching in wireless communications. It is believed that, under various proposed schemes in accordance with the present disclosure, issue(s) described herein may be addressed.

In one aspect, a method may involve a processor of a station (STA) MLD receiving an indication from a reporting AP affiliated with an AP MLD on one link of multiple links.

The method may also involve the processor determining a channel switching time when a reported AP switches from operating in a current channel of the reported AP to operating in a new channel on one other link of the multiple links based on the indication.

In another aspect, a method may involve a processor of a reporting AP MLD receiving an announcement of channel switching by a reported AP. The method may also involve the processor transmitting an indication on one link of multiple links indicating a channel switching time when the reported AP switches from operating in a current channel of the reported AP to operating in a new channel on one other link of the multiple links based on the indication.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, Zig Bee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 7 is a flowchart of an example process in accordance with an implementation of the present disclosure.

FIG. 8 is a flowchart of an example process in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EHT multi-link maximum channel switching in wireless communications. According to the present disclosure, a number of possible solutions may be implemented separately or jointly. That is, although these possible solutions may be described below separately, two or more of these possible solutions may be implemented in one combination or another.

Figure 1:
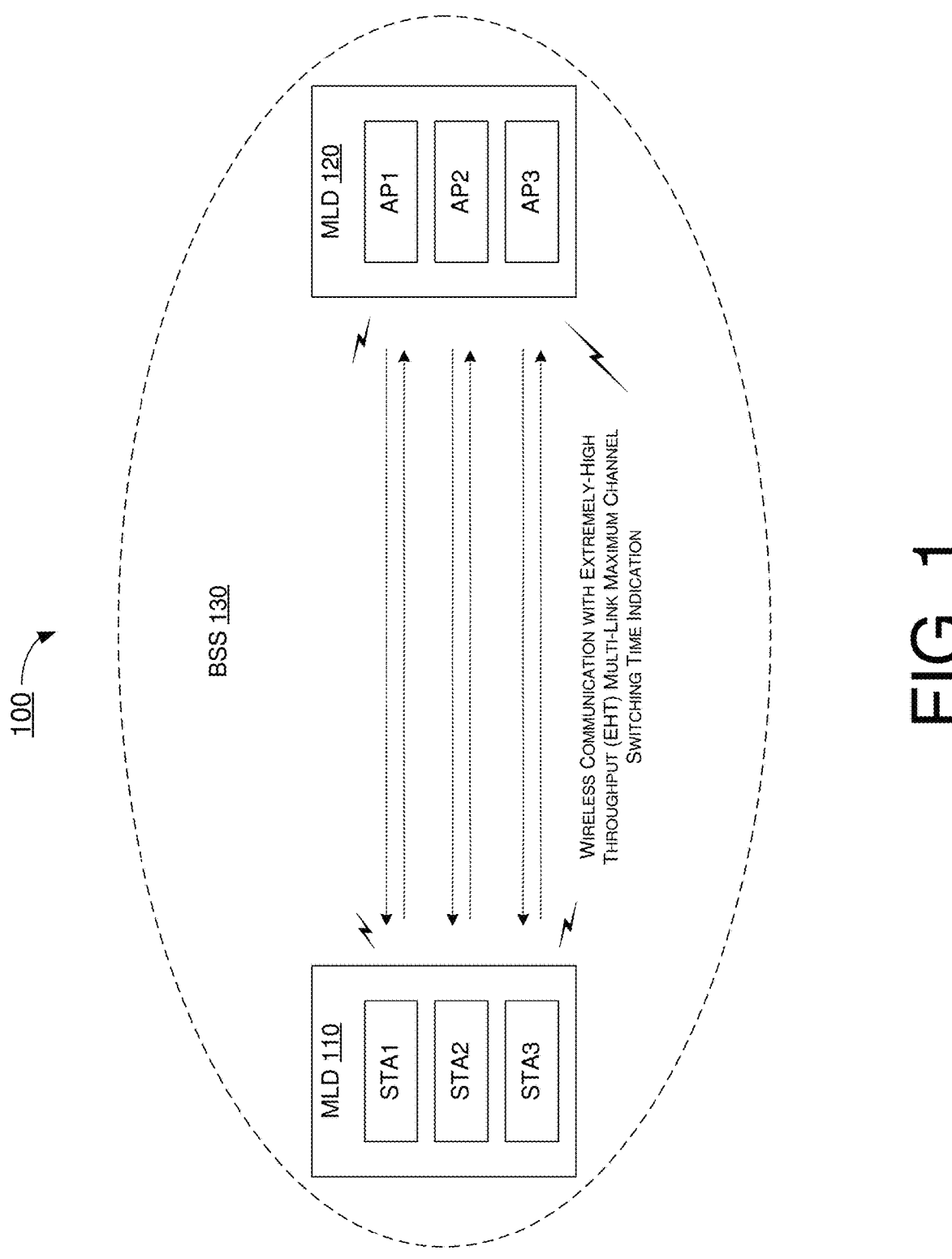
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 8 illustrate examples of implementation of various proposed schemes in network environment 100 in accordance with the present disclosure. The following description of various proposed schemes is provided with reference to FIG. 1~FIG. 8.

Referring to FIG. 1, network environment 100 may involve at least a first MLD, or MLD 110, and a second MLD, or MLD 120, communicating wirelessly with each other in a basic service set (BSS) 130 in accordance with one or more IEEE 802.11 standards (e.g., IEEE 802.11 be and beyond). Each STA of multiple STAs affiliated with MLD 110 may function as a non-AP STA, and each STA of multiple STAs affiliated with MLD 120 may function as an AP STA. That is, in the example shown in FIG. 1, MLD 110 may be non-AP MLD (herein interchangeably referred to as "STA MLD") and MLD 120 may be an AP MLD, although each of MLD 110 and MLD 120 may be an AP MLD or a STA MLD in various implementations. For simplicity and illustrative purposes without limiting the scope of the present disclosure, in FIG. 1, MLD 110 is shown to have three STAs ("STA1", "STA2" and "STA3" affiliated therewith) and MLD 120 is shown to have three APs ("AP1", "AP2" and "AP3" affiliated therewith), although in actual implementations the number of affiliated STAs/APs may be the same different (e.g., two instead of three). Moreover, each of MLD 110 and MLD 120 may be configured to utilize various schemes of EHT multi-link maximum channel switching in wireless communications in accordance with various proposed schemes, as described below. It is noteworthy that, while the various proposed schemes may be individually or separately described below, in actual implementations each of the proposed schemes may be utilized individually or separately. Alternatively, some or all of the proposed schemes may be utilized jointly.

With respect to multi-link procedures for channel switching, extended channel switching and channel quieting, in case that an (affected) AP affiliated with an AP MLD may include any of the following elements for itself in the Beacon frame or Probe Response frame it transmits: (a) Channel Switch Announcement element, (b) Extended Channel Switch Announcement element, (c) Max Channel Switch Time element, (d) Quiet element corresponding to quiet intervals other than quiet intervals scheduled to protect restricted target wake time (r-TWT) service periods (SPs), and (e) Quiet Channel element. Then, one of the following scenarios may apply. In a first scenario, another AP (reporting AP) affiliated with the same AP MLD and not corresponding to a non-transmitted basic service set identifier (BSSID) may carry the corresponding element(s) in the STA Profile field of the Per-STA Profile subelement corresponding to the affected AP contained in the Basic Multi-Link element included in the Beacon frame and Probe Response frame that it transmits. In a second scenario, an AP corresponding to the transmitted BSSID in the same multiple BSSID set as a non-transmitted BSSID (reporting AP) that is affiliated with the same AP MLD as the affected AP may carry the corresponding element(s) in the STA Profile field of the Per-STA Profile subelement corresponding to the affected AP contained in the Basic Multi-Link element corresponding to the AP MLD in the non-transmitted BSSID profile corresponding to the reporting AP in the Multiple BSSID element included in the Beacon frame and Probe Response frame that it transmits. In a third scenario, the timing fields in the Channel Switch Announcement element, the Extended Channel Switch Announcement element, the Quiet element, and the Quiet Channel element may be applied in reference to the most recent target beacon transmission time (TBTT) and beacon interval (BI) indicated in the corresponding element(s) of the affected AP and not to the TBTT and BI of the reporting AP.

Moreover, in case that an AP corresponding to the transmitted BSSID in a multiple BSSID set includes any of a number of elements in the non-transmitted BSSID profile corresponding to an affected AP in the Multiple BSSID element in the Beacon frame or Probe Response frame it transmits, or if any of those elements is inherited for the affected AP in these frames, and if the affected AP corresponding to a non-transmitted BSSID in the same multiple BSSID set is affiliated with an AP MLD, then one of a number of conditions may apply. The number of elements may include: (a) Channel Switch Announcement element, (b) Extended Channel Switch Announcement element, (c) Max Channel Switch Time element, (d) Quiet element corresponding to quiet intervals other than quiet intervals scheduled to protect r-TWT SPs, and (e) Quiet Channel element. In a first condition, another AP (reporting AP) affiliated with the same AP MLD and not corresponding to a non-transmitted BSSID may carry the corresponding element(s) in the STA Profile field of the Per-STA Profile subelement corresponding to the affected AP contained in the Basic Multi-Link element included in a Beacon frame and Probe Response frame that it transmits. In a second condition, an AP corresponding to the transmitted BSSID in the same multiple BSSID set as a non-transmitted BSSID (reporting AP) that is affiliated with the same AP MLD as the affected AP may carry the corresponding element(s) in the STA Profile field of the Per-STA Profile subelement corresponding to the affected AP contained in the Basic Multi-Link element carried in the Non-transmitted BSSID Profile subelement in the Multiple BSSID element included in a Beacon frame and Probe Response frame that it transmits. In a third condition, the timing fields in the Channel Switch Announcement element, the Extended Channel Switch Announcement element, the Quiet element, and the Quiet Channel element may be applied in reference to the most recent TBTT and BI included in the corresponding element(s) of the affected AP and not with respect to the TBTT and BI of the reporting AP.

Additionally, in case that an AP affiliated with an AP MLD is switching channel, the Channel Switch Announcement element, the Extended Channel Switch Announcement element, and the Max Channel Switch Time element may be included in every Beacon and Probe Response frames on all links of the AP MLD from right after the time the AP includes the elements in the Beacon frame it transmits until the intended channel switch time. The Max Channel Switch Time element, if used for this channel switch, may be included in the per-STA profile of the affected AP in every Beacon and Probe Response frames on all links of the AP MLD until the affected AP resumes BSS operation on the new channel. The value carried in the Switch Time field may indicate the estimated time of the first Beacon frame in the new channel. When an AP (affected AP) affiliated with an MLD is switching from an initial operating class/channel to a target operating class/channel at a target switch time using channel switch announcement procedure or extended channel switch announcement procedure, then certain conditions may apply. One condition may involve another AP (reporting AP) affiliated with the AP MLD setting the Operating Class and Channel Number fields corresponding to the affected AP that is reported in the Reduced Neighbor Report element in Beacon and Probe Response frames it transmits (or that the transmitted BSSID in the same multiple BSSID set as the reporting AP transmits if the reporting AP corresponds to a non-transmitted BSSID) before the target switch time to the initial operating class/channel. Another condition may involve another AP (reporting AP) affiliated with the AP MLD setting the Operating Class and Channel Number fields corresponding to the affected AP that is reported in the Reduced Neighbor Report element in Beacon and Probe Response frames it transmits (or that the transmitted BSSID in the same multiple BSSID set as the reporting AP transmits if the reporting AP corresponds to a non-transmitted BSSID)) at and after the target switch time to the target operating class/channel. Also, between the target switch time and the time at which, the AP may start beaconing in the target operating class/channel, the Neighbor AP TBTT Offset subfield for the corresponding AP in the Reduced Neighbor Report element shall be set to 255.

In an event that an AP (affected/reported AP) of an AP MLD is switching from an initial operating class/channel to a target operating class/channel at a target switch time using a channel switch announcement or extended channel switch announcement procedure and including a Max Channel Switch Time element in the Beacon and Probe Response frames it sends, and another AP (reporting AP) of the AP MLD receives a (Re)Association Request frame to perform multi-link setup with the AP MLD with the AP (affected/reported AP) as a requested link, then the other AP (reporting AP) may include the complete profile for the AP indicating the target operating class/channel and a Max Channel Switch Time element in the per-STA profile corresponding to the AP (affected/reported AP) in the Basic Multi-link element included in the (Re)Association Response frame it sends in response to indicate the time at which the AP (affected/reported AP) will start beaconing, if the (Re) Association Response frame is sent between the last beacon on the initial operating class/channel and the first beacon on the target operating class/channel. Otherwise, the other AP (reporting AP) may not include a Max Channel Switch Time element or (Extended) Channel Switch Announcement element in (Re)Association Response frames.

For example, given that a first AP (AP 1) and a second AP (AP 2) are two APs affiliated with an AP MLD that operate on a first link (Link 1) and a second link (Link 2), respectively, a Beacon frame transmitted by AP 1 may include a Channel Switch Announcement element to indicate that the channel on Link 1 (the affected AP) will be switched. From this point onward and until the channel on Link 1 switches, AP 2, which operates on Link 2 (the reporting AP), may include a Channel Switch Announcement element in the per-STA profile corresponding to AP 1 in the Basic Multi-Link element carried in the Beacon frame it transmits. When AP 1 begins to include the Channel Switch Announcement element in its Beacon frames, the Change Sequence subfield in the TBTT Information field corresponding to AP 1 in the Reduced Neighbor Report element carried in AP 2's Beacon frames may be incremented by 1. The values of the Channel Switch Count field of the Channel Switch Announcement element carried on Link 2 may be set by AP 2 with reference to Link 1. As the value of the beacon interval for AP 2 is twice the value of beacon interval for AP 1, the Channel Switch Count field of the Channel Switch Announcement element may be decremented by 2 in every subsequent beacon transmitted by AP 1. In an event that AP 1 carries the Extended Channel Switch Announcement element and the Max Channel Switch Time element in the Beacon frame its transmits, AP 2 may also include the Extended Channel Switch Announcement element and the Max Channel Switch Time element in the per-STA profile corresponding to AP 1 in the Basic Multi-Link element in the Beacon frames it transmits.

Figure 2:
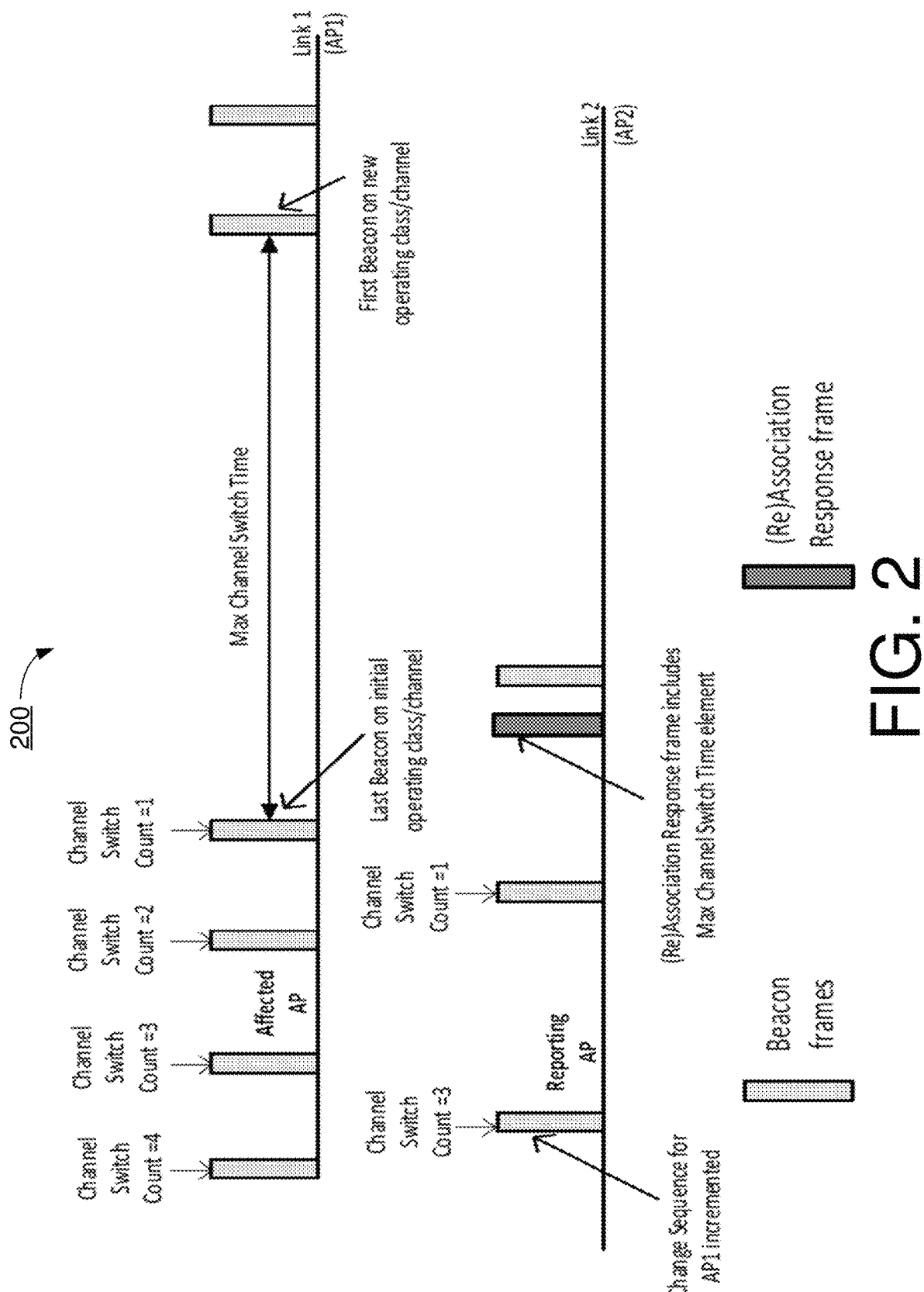
FIG. 2 is a diagram of an example scenario in accordance with an implementation of the present disclosure.

FIG. 2 illustrates an example scenario 200 of multi-link procedures for channel switching, extended channel switching and channel quieting. In scenario 200, the Channel Switch Announcement element, Extended Channel Switch Announcement element (if included by AP 1), and Max Channel Switch Time element (if included by AP 1) may also be included in the Per-STA Profile subelement of the Basic Multi-Link element corresponding to AP 1 carried in the Probe Response frames transmitted by AP 2. Referring to FIG. 2, in scenario 200 of an AP carrying a Channel Switch Announcement element to signal channel switching on another link, a STA affiliated with a non-AP MLD, that operates on Link 2, transmits a (Re)Association Request frame to AP 2 requesting Link 1 as one of the links for multi-link setup. Since the (Re)Association Response frame is transmitted by AP 2 after the last Beacon frame on the initial operating class/channel on Link 1 and before the first beacon on the target operating class/channel is transmitted, AP 2 may include the Max Channel Switch Time element in the per-STA profile corresponding to AP 1 in the (Re) Association Response frame it transmits. The value carried in Max Channel Switch Time element may provide an estimate of time until the first TBTT on the new channel on Link 1. The STA affiliated with the non-AP MLD operating on Link 1 does not transmit a frame until it hears the first Beacon frame from AP 1 on Link 1.

As can be seen, when an AP (e.g., an affected AP or a reported AP) affiliated with an AP MLD switches from the initial operating class/channel to the target operating class channel at the target switch time using a channel switch announcement procedure or an extended channel switch announcement procedure, the affected/reported AP does not transmit any Beacon frames under current IEEE specification. Another AP (reporting AP) affiliated with the AP MLD would need to provide information on when the affected/reported AP will continue Beacon transmission. Accordingly, there are two options proposed in the present disclosure to address this issue.

Under a first proposed scheme of EHT multi-link maximum channel switching, in accordance with the present disclosure, when an AP (e.g., reporting AP) affiliated with an AP MLD includes a Max Channel Switch Time element in a per-STA profile corresponding to another AP (e.g., affected/reported AP) in a frame the AP transmits after a last Beacon frame on an initial operating class/channel of the affected/reported AP and before a first beacon on a target operating class/channel is transmitted from/by the affected/reported AP, a Switch Time field in the Max Channel Switch Time element may indicate a maximum time delta, or difference, between: (i) a frame carrying the Max Channel Switch Time element in the per-STA profile corresponding to the affected/reported AP transmitted by the reporting AP and (ii) an expected time of a first Beacon frame on a new channel is transmitted from/by the affected reported AP. This maximum time delta may be expressed in time units (TUs).

Figure 3:
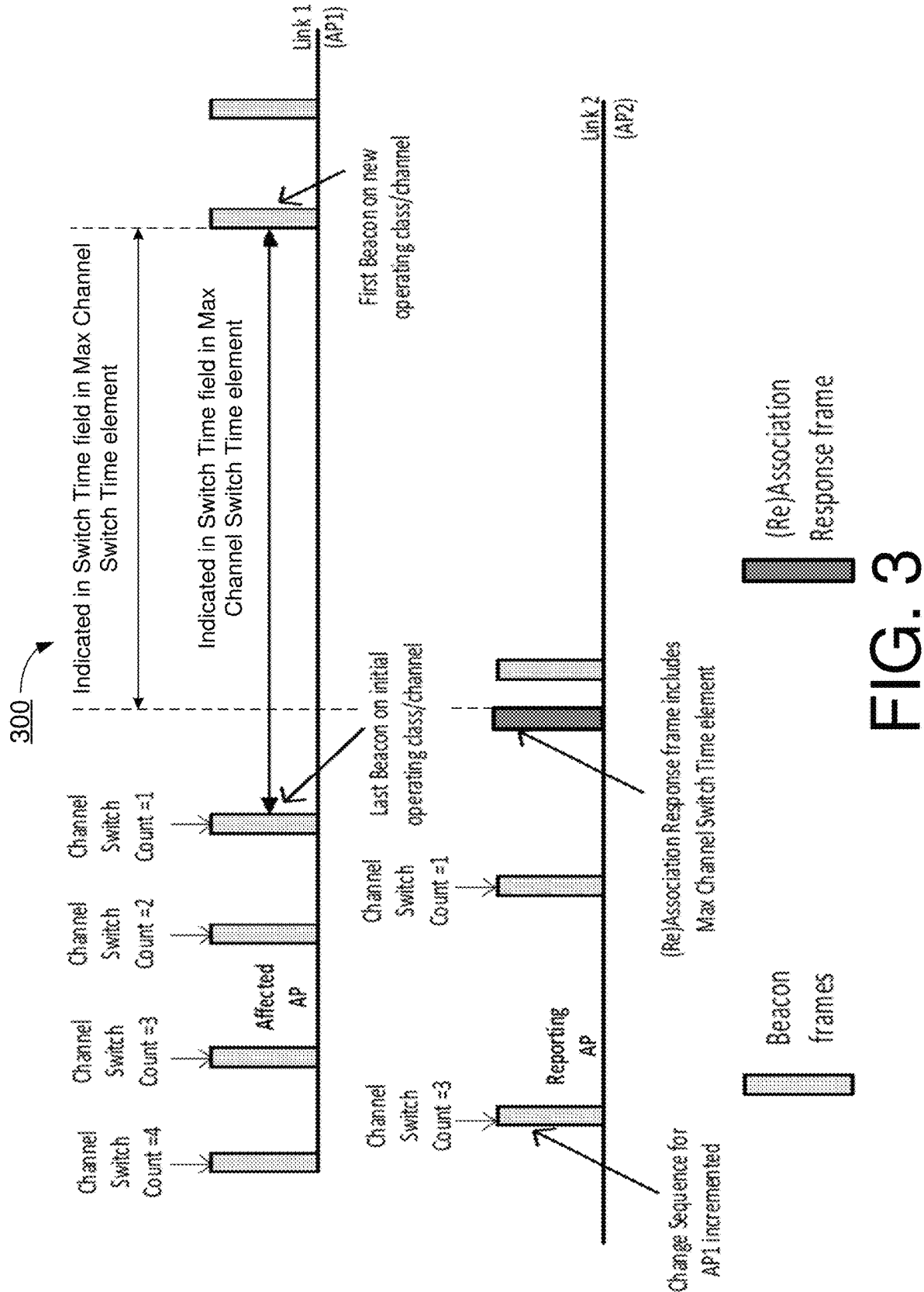
FIG. 3 is a diagram of an example scenario in accordance with an implementation of the present disclosure.

FIG. 3 illustrates an example scenario 300 under the first proposed scheme. Referring to FIG. 3, in an EHT multi-link operation involving at least a first AP (AP1) and a second AP (AP2), AP1 may operate on a first link (Link 1) as its primary link and AP2 may operate on a second link (Link 2) as its primary link. AP1 may switch its operating channel/class from an initial/current operating channel/class to a target/new operating channel/class on Link 1. Before the switching occurs, AP1 may announce the event of channel switching. For instance, AP1, as an affected or reported AP, may transmit beacon frames with each of the beacon frames carrying a respective channel switch count in a countdown manner (e.g., first beacon frame indicating channel switch count=4, second beacon frame indicating channel switch count=3, third beacon frame indicating channel switch count=2, and fourth beacon frame indicating channel switch count=1). In this example, the fourth beacon frame (indicating channel switch count=1) may be the last beacon frame transmitted by AP1 on the initial operating channel/class. The actual channel switching may occur sometime after this last beacon frame up to a duration of a maximum channel switching time after this last beacon frame. Similar or identical channel switching information may be announced in a Channel Switching Announcement element transmitted on Link 2 by AP2, as a reporting AP, thereby informing STAs on Link 2 that a channel switching is about to occur on Link 1.

Under the first proposed scheme, in the case of before the last beacon frame is transmitted by AP1 in its current channel on Link 1, a Switch Time field in the Max Channel Switch time element carried in a Basic Multi-Link element in a Per-STA Profile subelement corresponding to AP1 may indicate the maximum time delta (expressed in TUs) between the time the last beacon frame is transmitted by AP1 in its current channel on Link 1 and the expected time of the first beacon frame transmitted by AP1 in its new channel on Link 1. Moreover, in the case of after the last beacon frame is transmitted by AP1 in its current channel on Link 1, the Switch Time field may indicate an estimated time delta (expressed in TUs) between the time a frame carrying the Basic Multi-Link element containing the Max Channel Switch Time element is transmitted by AP2 on Link 2 and the expected time of the first beacon frame transmitted by AP1 in its new channel on Link 1. In scenario 300, the frame that carries the Basic Multi-Link element containing the Max Channel Switch Time element may be an association response frame (or re-association response frame) transmitted by AP2 on Link 2.

Under a second proposed scheme of EHT multi-link maximum channel switching, in accordance with the present disclosure, when an AP (e.g., reporting AP) affiliated with an AP MLD includes a Max Channel Switch Time element in a per-STA profile corresponding to another AP (e.g., affected/reported AP) in a frame the AP transmits after a last Beacon frame on an initial operating class/channel of the affected/reported AP and before a first beacon on a target operating class/channel is transmitted from/by the affected/reported AP, a Switch Time field in the Max Channel Switch Time element may indicate a maximum time delta, or difference, between: (i) a time the last Beacon frame is transmitted by the AP on the current channel and (ii) an expected time of a first Beacon frame on the new channel. This maximum time delta may be expressed in TUs. Under the second proposed scheme, a Switch Start Offset field in the Max Channel Switch Time element may indicate a maximum time delta, or difference, between: (i) the time the last Beacon frame was transmitted by the affected/reported AP on the current channel and (ii) a frame carrying the Max Channel Switch Time element in the per-STA profile corresponding to the affected/reported AP transmitted by the reporting AP. This maximum time delta may also be expressed in TUs.

Figure 4:
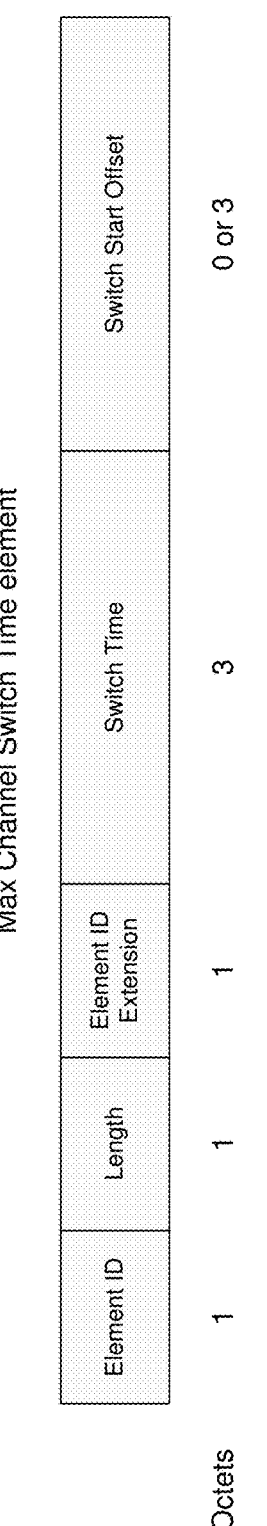
FIG. 4 is a diagram of an example design in accordance with an implementation of the present disclosure.

FIG. 4 illustrates an example design 400 under the second proposed scheme. Referring to FIG. 4, the Max Channel Switch Time element may include certain fields such as, for example and without limitation, an Element identifier (ID) field, a Length field, an Element ID Extension field, a Switch Time field, and an optional Switch Start Offset field. The Switch Time field may be 3 octets long. The Switch Start Offset field may be 0 octet (in case the Max Channel Switch Time element does not contain the Switch Start Offset field) or 8 octets long (in case the Max Channel Switch Time element contains the Switch Start Offset field).

Figure 5:
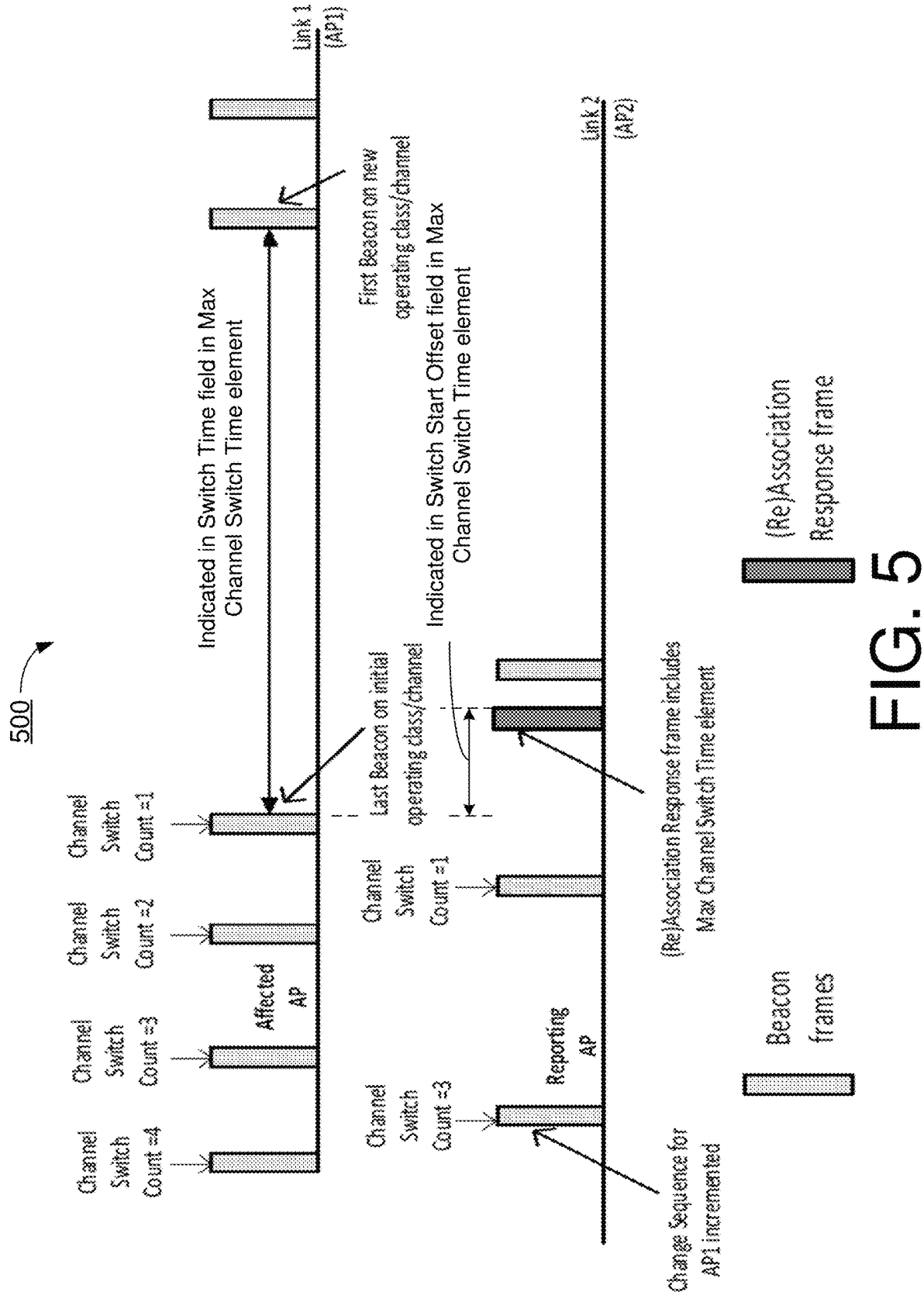
FIG. 5 is a diagram of an example scenario in accordance with an implementation of the present disclosure.

FIG. 5 illustrates an example scenario 500 under the second proposed scheme. Referring to FIG. 5, in an EHT multi-link operation involving at least a first AP (AP1) and a second AP (AP2), AP1 may operate on a first link (Link 1) as its primary link and AP2 may operate on a second link (Link 2) as its primary link. AP1 may switch its operating channel/class from an initial/current operating channel/class to a target/new operating channel/class on Link 1. Before the switching occurs, AP1 may announce the event of channel switching. For instance, AP1, as an affected or reported AP, may transmit beacon frames with each of the beacon frames carrying a respective channel switch count in a countdown manner (e.g., first beacon frame indicating channel switch count=4, second beacon frame indicating channel switch count=3, third beacon frame indicating channel switch count=2, and fourth beacon frame indicating channel switch count=1). In this example, the fourth beacon frame (indicating channel switch count=1) may be the last beacon frame transmitted by AP1 on the initial operating channel/class. The actual channel switching may occur sometime after this last beacon frame up to a duration of a maximum channel switching time after this last beacon frame. Similar or identical channel switching information may be announced in a Channel Switching Announcement element transmitted on Link 2 by AP2, as a reporting AP, thereby informing STAs on Link 2 that a channel switching is about to occur on Link 1.

Under the second proposed scheme, in case the case of before the last beacon frame is transmitted by AP1 in its current channel on Link 1, a Switch Time field in the Max Channel Switch time element carried in a Basic Multi-Link element in a Per-STA Profile subelement corresponding to AP1 may indicate the maximum time delta (expressed in TUs) between the time the last beacon frame is transmitted by AP1 in its current channel on Link 1 and the expected time of the first beacon frame transmitted by AP1 in its new channel on Link 1. Furthermore, in the case of after the last beacon frame is transmitted by AP1 in its current channel on Link 1, the Switch Time field may indicate a maximum time delta (expressed in TUs) between the time the last beacon frame was transmitted by AP1 in its current channel on Link 1 and the time a frame carrying the Basic Multi-Link element containing the Max Channel Switch Time element is transmitted by AP2 on Link 2. In scenario 500, the frame that carries the Basic Multi-Link element containing the Max Channel Switch Time element may be an association response frame (or re-association response frame) transmitted by AP2 on Link 2. In the latter case, upon receiving the information on the maximum time delta, a STA on Link 2 may determine the expected latest channel switching time of AP1 on Link 1 by subtracting the indicated time delta from the maximum time delta between the time the last beacon frame is transmitted by AP1 in its current channel on Link 1 and the expected time of the first beacon frame transmitted by AP1 in its new channel on Link 1.

Under an alternative option of the second proposed scheme, when an AP (e.g., reporting AP) affiliated with an AP MLD includes a Max Channel Switch Time element in a per-STA profile corresponding to another AP (e.g., affected/reported AP) in a frame the AP transmits after a last Beacon frame on an initial operating class/channel of the affected/reported AP and before a first beacon on a target operating class/channel is transmitted from/by the affected/reported AP, a Switch Time field in the Max Channel Switch Time element may indicate a maximum time delta, or difference, between: (i) a time the last Beacon frame is transmitted by the AP on the current channel and (ii) an expected time of a first Beacon frame on the new channel. This maximum time delta may be expressed in TUs. Under the second proposed scheme, a Switch Start Offset field in the Max Channel Switch Time element may indicate a maximum time delta, or difference, between: (i) the time the last Beacon frame was transmitted by the affected/reported AP on the current channel and (ii) a TBTT immediately after (or before) the frame carrying the Max Channel Switch Time element in the per-STA profile corresponding to the affected/reported AP transmitted by the reporting AP. This maximum time delta may be expressed in TUs.

Illustrative Implementations

Figure 6:
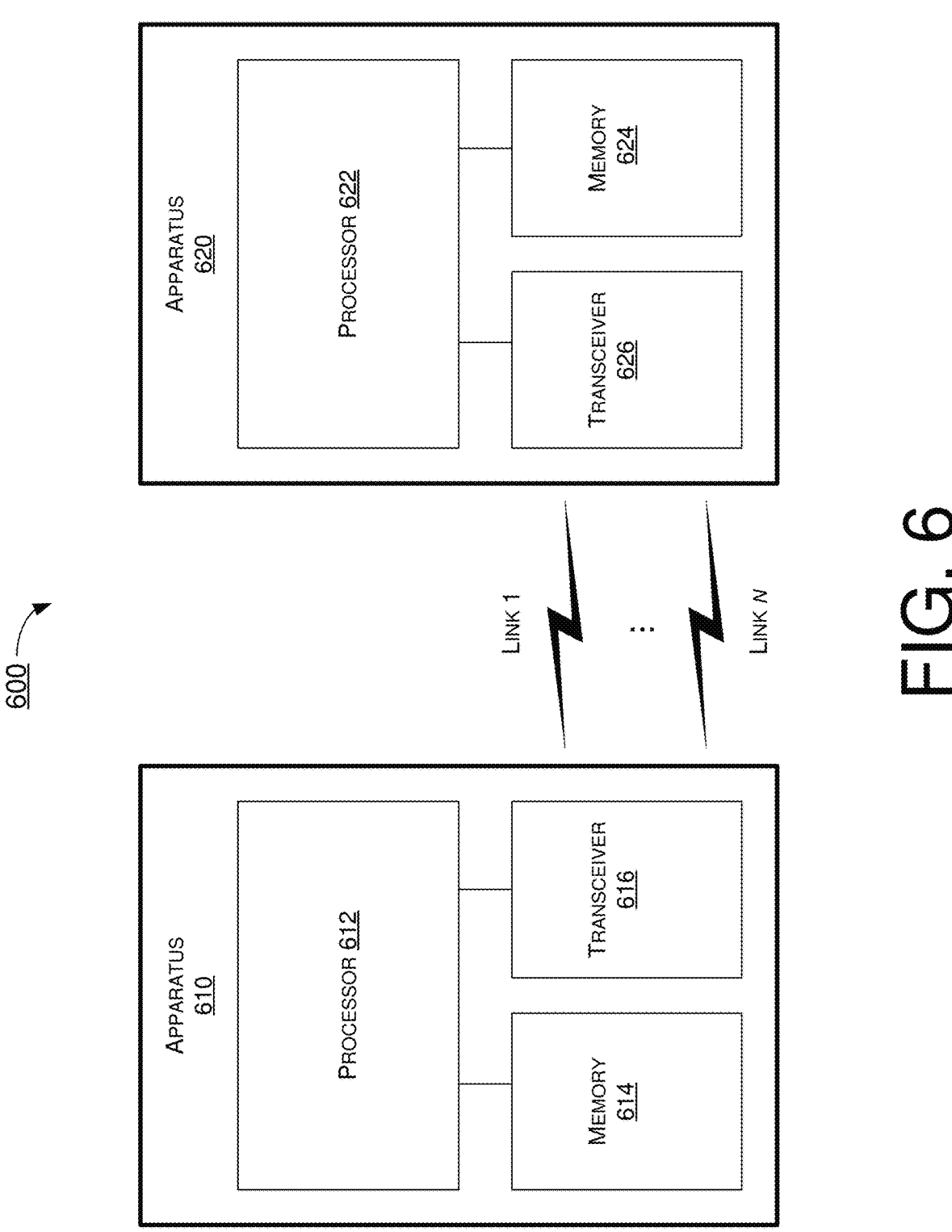
FIG. 6 is a block diagram of an example communication system in accordance with an implementation of the present disclosure.

FIG. 6 illustrates an example system 600 having at least an example apparatus 610 and an example apparatus 620 in accordance with an implementation of the present disclosure. Each of apparatus 610 and apparatus 620 may perform various functions to implement schemes, techniques, processes and methods described herein pertaining to EHT multi-link maximum channel switching in wireless communications, including the various schemes described above with respect to various proposed designs, concepts, schemes, systems and methods described above as well as processes described below. For instance, apparatus 610 may be an example implementation of MLD 110 or MLD 120, and apparatus 620 may be an example implementation of MLD 120.

Each of apparatus 610 and apparatus 620 may be a part of an electronic apparatus such as, for example and without limitation, a portable or mobile apparatus, a wearable apparatus, a wireless communication apparatus or a computing apparatus. For instance, each of apparatus 610 and apparatus 620 may be implemented in a smartphone, a smart watch, a personal digital assistant, a digital camera, or a computing equipment such as a tablet computer, a laptop computer or a notebook computer. Each of apparatus 610 and apparatus 620 may also be a part of a machine type apparatus, which may be an IoT apparatus such as an immobile or a stationary apparatus, a home apparatus, a wire communication apparatus or a computing apparatus. For instance, each of apparatus 610 and apparatus 620 may be implemented in a smart thermostat, a smart fridge, a smart door lock, a wireless speaker or a home control center. When implemented in or as a network apparatus, apparatus 610 and/or apparatus 620 may be implemented in a network node, such as an AP in a WLAN.

In some implementations, each of apparatus 610 and apparatus 620 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Each of apparatus 610 and apparatus 620 may include at least some of those components shown in FIG. 6 such as a processor 612 and a processor 622, respectively, for example. Each of apparatus 610 and apparatus 620 may further include one or more other components not pertinent to the proposed scheme of the present disclosure (e.g., internal power supply, display device and/or user interface device), and, thus, such component(s) of apparatus 610 and apparatus 620 are neither shown in FIG. 6 nor described below in the interest of simplicity and brevity.

In one aspect, each of processor 612 and processor 622 may be implemented in the form of one or more single-core processors, one or more multi-core processors, one or more RISC processors or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including those pertaining to EHT multi-link maximum channel switching in wireless communications in accordance with various implementations of the present disclosure.

In some implementations, apparatus 610 may also include a transceiver 616 coupled to processor 612. Transceiver 616 may be capable of wirelessly transmitting and receiving data. In some implementations, apparatus 620 may also include a transceiver 626 coupled to processor 622. Transceiver 626 may include a transceiver capable of wirelessly transmitting and receiving data. Transceiver 616 of apparatus 610 and transceiver 626 of apparatus 620 may wirelessly communicate with each other over one or more of multiple links link 1~link N, with N being a positive integer greater than 1, such as a first link and a second link.

In some implementations, apparatus 610 may further include a memory 614 coupled to processor 612 and capable of being accessed by processor 612 and storing data therein. In some implementations, apparatus 620 may further include a memory 624 coupled to processor 622 and capable of being accessed by processor 622 and storing data therein. Each of memory 614 and memory 624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 614 and memory 624 may include a type of read-only memory (ROM) such as mask ROM, programmable ROM (PROM), erasable program-mable ROM (EPROM) and/or electrically erasable pro-grammable ROM (EEPROM). Alternatively, or additionally, each of memory 614 and memory 624 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 610 and apparatus 620 may be a communication entity capable of communicating with each other using various proposed schemes in accordance with the present disclosure. For illustrative purposes and without limitation, a description of capabilities of apparatus 610, as MLD 110 or MLD 120 which may be a non-AP MLD, and apparatus 620, as MLD 120 which may be an AP MLD, is provided below in the context of example processes 700 and 800. It is noteworthy that, although the example implemen-tations described below are provided in the context of WLAN, the same may be implemented in other types of networks.

Illustrative Processes

FIG. 7 illustrates an example process 700 in accordance with an implementation of the present disclosure. Process 700 may represent an aspect of implementing various pro-posed designs, concepts, schemes, systems and methods described above. More specifically, process 700 may repre-sent an aspect of the proposed concepts and schemes per-taining to EHT multi-link maximum channel switching in wireless communications in accordance with the present disclosure. Process 700 may include one or more operations, actions, or functions as illustrated by one or more of blocks 710 and 720. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively, in a different order. Furthermore, one or more of the blocks/sub-blocks of process 700 may be executed repeatedly or iteratively. Process 700 may be implemented by or in apparatus 610 and apparatus 620 as well as any variations thereof. Solely for illustrative pur-poses and without limiting the scope, process 700 is described below in the context of apparatus 610 as MLD 110 (e.g., a non-AP MLD) and apparatus 620 as MLD 120 (e.g., an AP MLD) of a wireless network such as a WLAN in accordance with one or more of IEEE 802.11 standards. Process 700 may begin at block 710.

At 710, process 700 may involve processor 612 of appa-ratus 610, as a STA affiliated with a STA MLD (e.g., MLD 110), receiving, via transceiver 616, an indication from a reporting AP affiliated with an AP MLD (e.g., apparatus 620 as MDL 120) on one link of multiple links. Process 700 may proceed from 710 to 720.

At 720, process 700 may involve processor 612 deter-mining a channel switching time when a reported AP switches from operating in a current channel of the reported AP to operating in a new channel on one other link of the multiple links based on the indication.

In some implementations, in receiving, process 700 may involve processor 612 receiving the indication before a last beacon frame is transmitted on the current channel of the reported AP. In such cases, the indication may indicate a maximum time delta between a time the last beacon frame is transmitted by the reported AP in the current channel and an expected time of a first beacon frame being transmitted by the reported AP in the new channel. Moreover, in determin-ing, process 700 may involve processor 612 determining the channel switching time as the maximum time delta. Fur-thermore, in receiving, process 700 may further involve processor 612 receiving the indication in an association response frame or a re-association response frame transmit-ted by the reporting AP.

In some implementations, in receiving, process 700 may involve processor 612 receiving the indication before a last beacon frame is transmitted on the current channel of the reported AP. In such cases, the indication may indicate an estimated time delta between a time a frame carrying a Basic Multi-Link element containing a Max Channel Switch Time element is transmitted by the reporting AP and an expected time of a first beacon frame being transmitted by the reported AP in the new channel. Moreover, in determining, process 700 may involve processor 612 determining the channel switching time by subtracting the estimated time delta from a maximum time delta between a time the last beacon frame is transmitted by the reported AP in the current channel and the expected time of the first beacon frame being transmitted by the reported AP in the new channel. Furthermore, in receiving, process 700 may further involve processor 612 receiving the indication in an association response frame or a re-association response frame transmit-ted by the reporting AP.

In some implementations, in receiving, process 700 may involve processor 612 receiving the indication in a Switch Time field in a Max Channel Switch Time element carried in a Basic Multi-Link element in a per-STA Profile subele-ment corresponding to the reported AP.

FIG. 8 illustrates an example process 800 in accordance with an implementation of the present disclosure. Process 800 may represent an aspect of implementing various pro-posed designs, concepts, schemes, systems and methods described above. More specifically, process 800 may repre-sent an aspect of the proposed concepts and schemes per-taining to EHT multi-link maximum channel switching in wireless communications in accordance with the present disclosure. Process 800 may include one or more operations, actions, or functions as illustrated by one or more of blocks 810 and 820. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively, in a different order. Furthermore, one or more of the blocks/sub-blocks of process 800 may be executed repeatedly or iteratively. Process 800 may be implemented by or in apparatus 610 and apparatus 620 as well as any variations thereof. Solely for illustrative pur-poses and without limiting the scope, process 800 is described below in the context of apparatus 610 as MLD 110 (e.g., a non-AP MLD) and apparatus 620 as MLD 120 (e.g., an AP MLD) of a wireless network such as a WLAN in accordance with one or more of IEEE 802.11 standards. Process 800 may begin at block 810.

At 810, process 800 may involve processor 622 of appa-ratus 620, as a reporting AP affiliated with an AP MLD (e.g., MLD 120), receiving, via transceiver 626, an announcement of channel switching by a reported AP. Process 800 may proceed from 810 to 820.

At 820, process 800 may involve processor 622 transmit-ting, via transceiver 626, an indication on one link of multiple links indicating a channel switching time when the reported AP switches from operating in a current channel of the reported AP to operating in a new channel on one other link of the multiple links based on the indication.

In some implementations, in transmitting, process 800 may involve processor 622 transmitting the indication before a last beacon frame is transmitted on the current channel of the reported AP. In such cases, the indication may indicate a maximum time delta between a time the last beacon frame is transmitted by the reported AP in the current channel and an expected time of a first beacon frame being transmitted by the reported AP in the new channel.

In some implementations, in transmitting, process 800 may involve processor 622 transmitting the indication before a last beacon frame is transmitted on the current channel of the reported AP. In such cases, the indication may indicate an estimated time delta between a time a frame carrying a Basic Multi-Link element containing a Max Channel Switch Time element is transmitted by the reporting AP and an expected time of a first beacon frame being transmitted by the reported AP in the new channel.

In some implementations, in transmitting, process 800 may involve processor 622 transmitting the indication in a Switch Time field in a Max Channel Switch Time element carried in a Basic Multi-Link element in a per-STA Profile subelement corresponding to the reported AP.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds 'true' for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the 'true' scope and spirit being indicated by the following claims.

What is claimed is:

1. A method, comprising:

receiving, by a processor of a station (STA) multi-link device (MLD), an indication from a reporting access point (AP) affiliated with an AP MLD on one link of multiple links; and determining, by the processor, a channel switching time when a reported AP switches from operating in a current channel of the reported AP to operating in a new channel on one other link of the multiple links based on the indication, wherein the receiving comprises receiving the indication after a last beacon frame is transmitted on the current channel of the reported AP wherein the indication indicates an estimated time delta between a time a frame carrying a Basic Multi-Link element containing a Max Channel Switch Time element is transmitted by the reporting AP and an expected time of a first beacon frame being transmitted by the reported AP in the new channel, and wherein the receiving further comprises receiving the indication in an association response frame or a re-association response frame transmitted by the reporting AP.

2. The method of claim 1, wherein the determining comprises determining the channel switching time by sub-tracting the estimated time delta from a maximum time delta between a time the last beacon frame is transmitted by the reported AP in the current channel and the expected time of the first beacon frame being transmitted by the reported AP in the new channel.

3. An apparatus, comprising:

a transceiver configured to communicate wirelessly; and a processor coupled to the transceiver and configured to perform, as a station (STA) affiliated with a STA multi-link device (MLD), operations comprising:

receiving, via the transceiver, an indication from a reporting access point (AP) affiliated with an AP MLD on one link of multiple links; and determining a channel switching time when a reported AP switches from operating in a current channel of the reported AP to operating in a new channel on one other link of the multiple links based on the indica-tion, wherein the receiving comprises receiving the indication after a last beacon frame is transmitted on the current channel of the reported AP wherein the indication indicates an estimated time delta between a time a frame carrying a Basic Multi-Link element containing a Max Channel Switch Time ele-ment is transmitted by the reporting AP and an expected time of a first beacon frame being transmitted by the reported AP in the new channel, and wherein the receiving further comprises receiving the indication in an association response frame or a re-association response frame transmitted by the reporting AP.

4. The apparatus of claim 3, wherein the determining comprises determining the channel switching time by sub-tracting the estimated time delta from a maximum time delta between a time the last beacon frame is transmitted by the reported AP in the current channel and the expected time of the first beacon frame being transmitted by the reported AP in the new channel.

* * * * *